US006986143B2

(12) United States Patent
Cole et al.

(10) Patent No.: US 6,986,143 B2
(45) Date of Patent: Jan. 10, 2006

(54) REDUCING THE SIZE OF GENERATED CODE USED TO CALL COMMON OBJECT MODEL OBJECTS, WHILE PRESERVING TYPE-CHECKING

(75) Inventors: Gary L. Cole, Endicott, NY (US); William F. Phillips, Owego, NY (US)

(73) Assignee: International Business Machines Corporation, Armonk, NY (US)

( * ) Notice: Subject to any disclaimer, the term of this patent is extended or adjusted under 35 U.S.C. 154(b) by 664 days.

(21) Appl. No.: 09/955,771

(22) Filed: Sep. 19, 2001

(65) Prior Publication Data

US 2003/0056023 A1    Mar. 20, 2003

(51) Int. Cl.
    G00F 9/44    (2006.01)
(52) U.S. Cl. .................. 719/315; 717/108; 717/116; 717/118; 717/140; 707/103 Y
(58) Field of Classification Search ............... 709/316, 709/317; 719/310, 315–318; 707/108, 116, 707/118, 140, 103 Y
    See application file for complete search history.

(56) References Cited

U.S. PATENT DOCUMENTS

| 5,999,986 | A | * | 12/1999 | McCauley, III et al. ..... | 719/310 |
| 6,006,230 | A | * | 12/1999 | Ludwig et al. ............... | 707/10 |
| 6,014,666 | A | | 1/2000 | Helland et al. ................. | 707/9 |
| 6,016,392 | A | | 1/2000 | Jordan ........................ | 395/682 |
| 6,298,391 | B1 | * | 10/2001 | Kennedy et al. ............ | 719/328 |
| 6,633,923 | B1 | * | 10/2003 | Kukura et al. .............. | 719/316 |
| 6,701,485 | B1 | * | 3/2004 | Igra et al. .................... | 715/503 |
| 6,769,123 | B1 | * | 7/2004 | Chan .......................... | 719/315 |

FOREIGN PATENT DOCUMENTS

CA        2204974      11/1998

OTHER PUBLICATIONS

Thornton, "Using non-Java code", Feb. 2000, pp. 1-29.*
Bea, "Using COM Object from Java", 2001, pp. 1-4.*
Quoin, "COM versus CORBA: A Decision Framework", Oct. 1996, pp. 1-56.*
"Generic Wireless Telecommunications System", United States Statutory Invention Registration, Reg. No. H1,921, Nov. 7, 2000, Fletcher et al.
"Dynamic proxy classes: toward metalevel programming in Java", Ritcher, M; Suezawa, T.; Java Report, vol. 5, No. 8, pp. 32-41, Aug. 2000.
"Javanaise: distributed shared objects for Internet cooperative applications"—Hagimont, D; Louvegnies, D.; Middleware '98. IPIP Int'l Conf. on Distributed Systems Platforms and Open Distributed Processing, pp. 339-354, 1998. (Abstract only).
"Providing easier access to remote objects in client-server systems"—Aldrich, J; Dooley, J.; Mandelsohn, S.; Rifkin, A.; Proc. Thirty-First Hawaii Int'l Conf. on System Sciences, vol. 7, pp366-375, 1998, IEEE Comput. Soc. (Abstract only).
"Improved Process for Visual Development of Client/Server Programs", IBM Technical Disclosure Bulletin, Jan. 1998, v41, n01, p281-283.

* cited by examiner

*Primary Examiner*—Thomas Lee
*Assistant Examiner*—Phuong N. Hoang
(74) *Attorney, Agent, or Firm*—Arthur J. Samodovitz

(57) ABSTRACT

Objects of one object model (e.g., a Common Object Model (COM)) are called by programs of another object model (e.g., Java). To facilitate the call, a set of interfaces is generated that corresponds to the interfaces of a COM typelib. The interfaces include enough information to enable type-checking of the generated code to be performed during compilation, but do not include implementations of the interfaces. The implementations are included in a proxy object, which is employed in making the call to the COM object.

24 Claims, 7 Drawing Sheets

REDUCING THE SIZE OF GENERATED CODE USED TO CALL COMMON OBJECT MODEL OBJECTS, WHILE PRESERVING TYPE-CHECKING

CROSS-REFERENCE TO RELATED APPLICATIONS

This application contains subject matter which is related to the subject matter of the following applications, each of which is assigned to the same assignee as this application. Each of the below listed applications is hereby incorporated herein by reference in its entirety:

"Apparatus And Method For Automatic And Customizable Generation Of Objects In A Distributed Object Relational System", Ser. No. 09/544,273, filed Apr. 6, 2000, abandoned Jan. 27, 2003; and "Process And System For A Client Object To Perform A Remote Method Invocation Of A Method In A Server Object", Ser. No. 09/259,141, filed Feb. 26, 1999, abandoned Mar. 10, 2004.

TECHNICAL FIELD

This invention relates, in general, to object-oriented programming, and in particular, to reducing the size of generated code used to call objects of one object model from object-oriented programs of another object model, while preserving type-checking.

BACKGROUND OF THE INVENTION

Often, a program written in an object-oriented language of one object model, such as Java, desires to call objects of another object model, such as Common Object Model (COM) objects. In order to call COM objects, a typelib of COM interfaces is transformed into a set of Java source code that defines stub classes that indirectly call a small set of native methods, which in turn call the desired COM interfaces. In particular, a Java class is generated for each interface defined in the COM typelib. Each generated class provides a callable and type-checked interface for user Java code to invoke; encapsulates the method number required for the COM call; marshals the Java arguments into a form usable by the native code; and unmarshals the return value into the return type expected by the Java caller.

Since a Java class is generated for each interface defined in the COM typelib and the COM typelib is sometimes large (e.g., thousands of interfaces), a large amount of Java object code is sometimes generated. Thus, a large amount of space is sometimes needed for the generated Java object code.

Based on the foregoing, a need exists for a capability that enables the amount of object code generated and used to call objects of one object model from object-oriented programs of another object model to be reduced. A further need exists for decreasing the size of the generated object code without sacrificing certain advantages of generated code, such as the availability of type-checking at compilation time.

SUMMARY OF THE INVENTION

The shortcomings of the prior art are overcome and additional advantages are provided through the provision of a method of facilitating calls to objects. The method includes, for instance, determining an identifier of a method to be invoked on an object, the determining using at least a portion of a method signature corresponding to the method and generated from a typelib associated with the object; and employing a proxy object, which implements the method identified by the identifier, to facilitate a call to the object.

In a further embodiment, a method of calling objects is provided. The method includes, for instance, initiating a call from a calling program of one object model to an object of another object model, the initiating including calling a method of the object, the method corresponding to the one object model of the calling program, and the method having a method signature generated from a typelib associated with the object; employing, by a proxy object in receipt of the initiated call, one or more arguments of the method signature and an identifier of the method to provide a call to a native method of the object; and using the native method to call the object.

System and computer program products corresponding to the above-summarized methods are also described and claimed herein.

Advantageously, object-oriented programs of one object model can call objects of another object model using a reduced size of generated code, while preserving type-checking associated with the generated code. In one example, interfaces are automatically generated to allow a Java object to call a COM object.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided that enables low-level objects, such as COM objects, to be called from a higher-level programming language, such as Java, using a reduced amount of generated code (e.g., Java code) and without sacrificing type-checking performed during compilation of the generated code.

Figure 1:
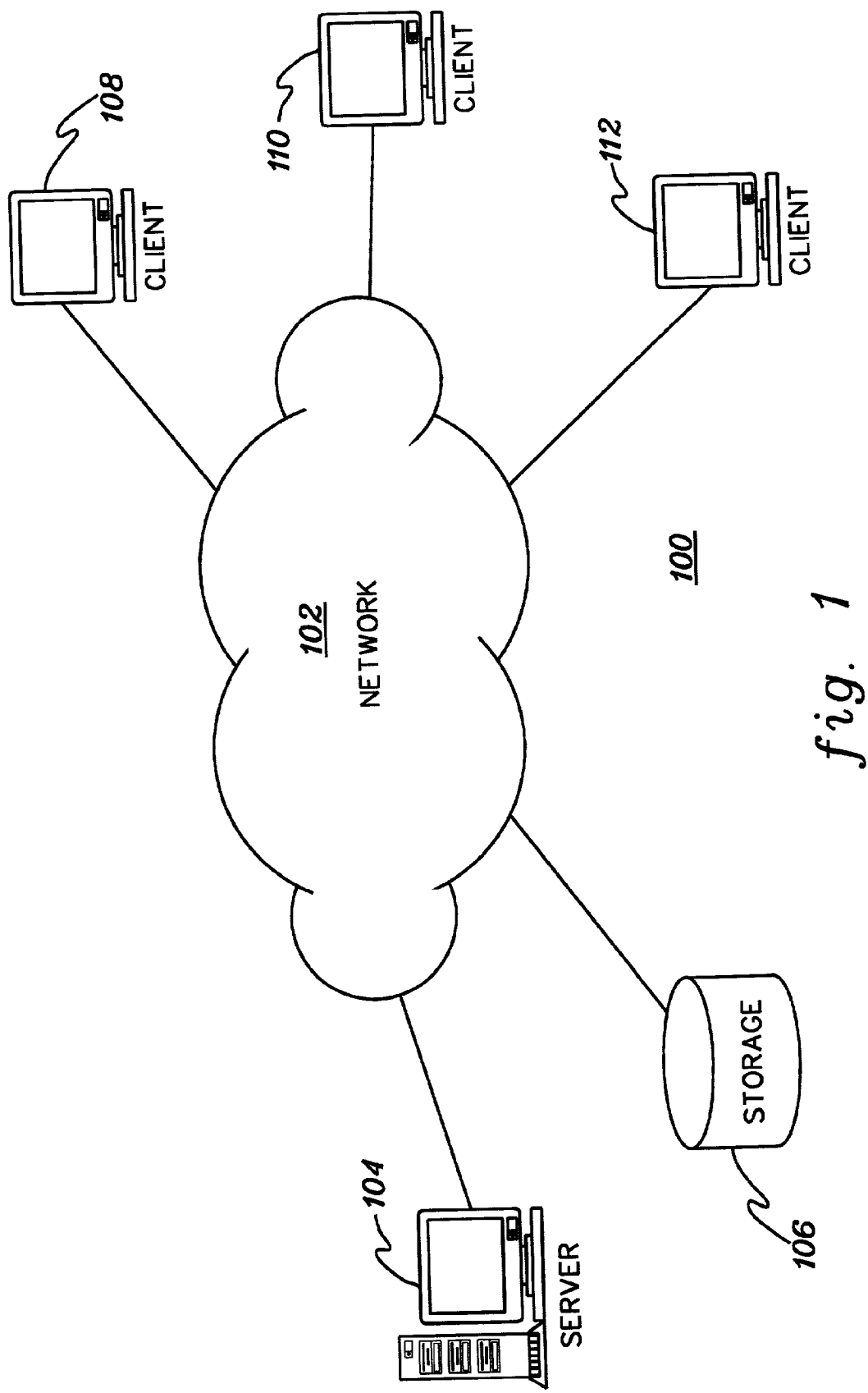
FIG. 1 depicts one embodiment of a communications environment incorporating and/or using one or more aspects of the present invention.

One embodiment of a communications environment incorporating and/or using one or more aspects of the present invention is described with reference to FIG. 1. In one example, the communications environment is a distributed data processing system 100, which includes a network of computers. Distributed data processing system 100 includes a network 102, which is the medium used to provide communications links between various devices and computers coupled within distributed data processing system 100. Network 102 may include permanent connections, such as wire or fiber optic cables, or temporary connections made through telephone connections.

Network 102 is coupled to, for instance, at least one server 104, at least one storage unit 106, and a plurality of clients 108, 110 and 112. Server 104 provides data, such as boot files, operating system images and applications, to clients 108–112. Clients 108, 110 and 112 are clients to server 104, and may be, for example, personal computers or network computers. For purposes of this application, a network computer is any computer coupled to a network that receives a program or other applications from another computer coupled to the network. Distributed data processing system 100 may include additional servers, clients and/or other devices not shown.

In the example described herein, distributed data processing system 100 is the Internet, with network 102 representing a worldwide collection of networks and gateways that use the TCP/IP suite of protocols to communicate with one another. At the heart of the Internet is a backbone of high-speed data communications lines between nodes or host computers, including thousands of commercial, government, education, and/or other computer systems that route data and messages. Distributed data processing system 100 may also be implemented as a number of different types of networks such as, for example, an intranet or a local area network. FIG. 1 is intended as an example and not as an architectural limitation for the capabilities of the present invention.

Further details associated with one example of a server 104 are described with reference to FIG. 2. In one embodiment, server 104 is implemented as a data processing system 200, such as a Symmetric Multiprocessor (SMP) system, which includes a plurality of processors, such as processors 202 and 204. Alternatively, a single processor system may be employed.

In the example depicted herein, processors 202 and 204 are coupled to a system bus 206. Also coupled to system bus 206 are a memory controller/cache 208, which provides an interface to a local memory 209; and an I/O bus bridge 210, which provides an interface to an I/O bus 212. Memory controller/cache 208 and I/O bus bridge 210 may be integrated, as depicted.

I/O bus 212 is coupled to a peripheral component interconnect (PCI) bus bridge 214, which provides an interface to a PCI local bus 216. Coupled to PCI bus 216 are one or more modems 218 and one or more network adapters 220. Typical PCI bus implementations support four PCI expansion slots or add-in connectors. Modem 218 and network adapter 220 through the add-in boards may provide communications links to network computers 108–112.

Additional PCI bus bridges 222 and 224 provide interfaces for additional PCI buses 226 and 228, from which additional modems or network adapters may be supported. In this manner, server 200 allows connections to multiple network computers. In addition to the above, a memory mapped graphics adapter 230 and a hard disk 232 may also be coupled to I/O bus 212 as depicted, either directly or indirectly.

Figure 2:
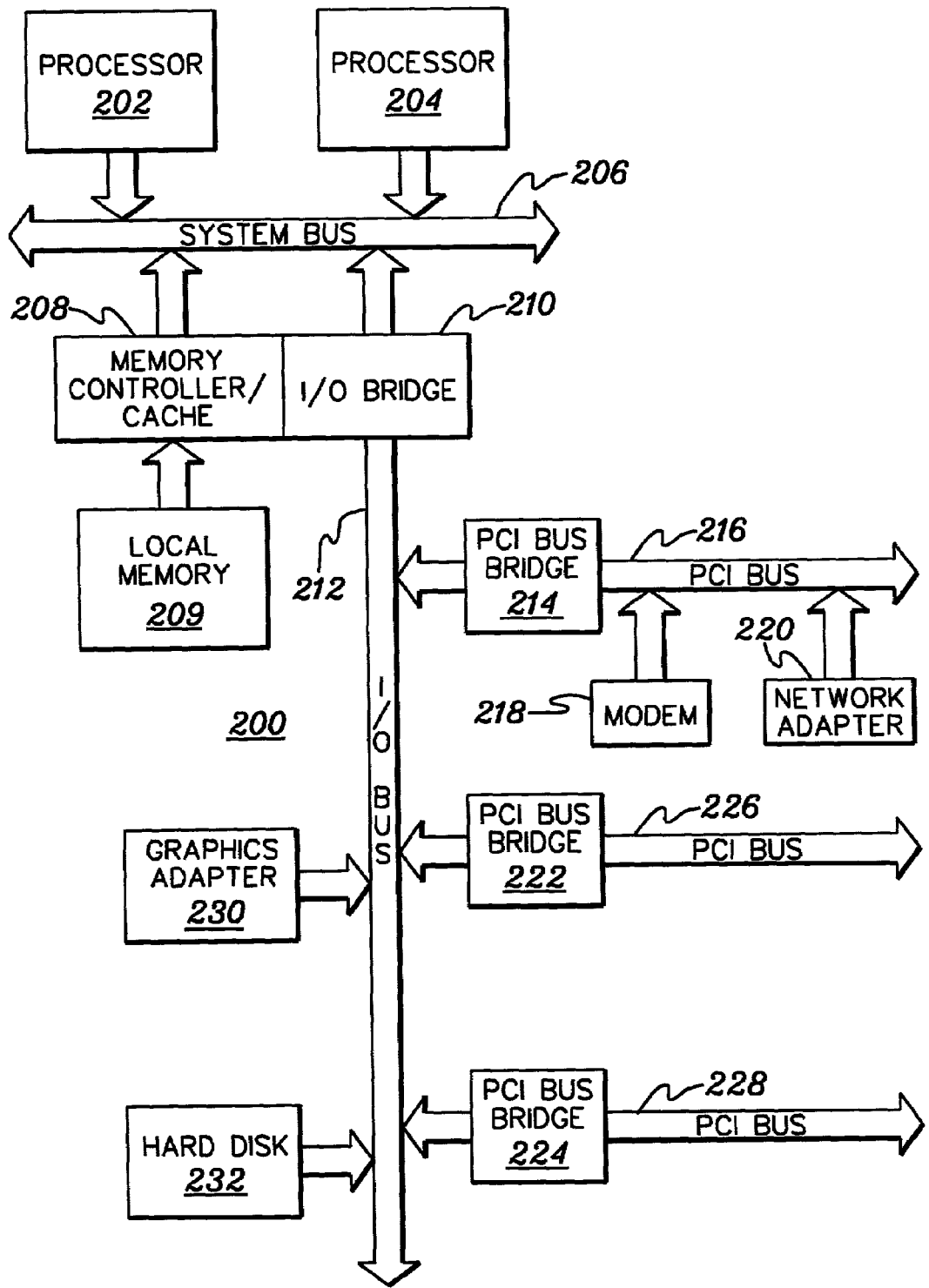
FIG. 2 depicts one embodiment of a server of FIG. 1, in accordance with an aspect of the present invention.

Those of ordinary skill in the art will appreciate that the hardware depicted in FIG. 2 may vary. For example, other peripheral devices, such as optical disk drives and the like, may be used in addition to or in place of the hardware depicted. The depicted example is not meant to imply architectural limitations with respect to the present invention. The data processing system depicted in FIG. 2 may be, for instance, a RISC/System 6000, a product of International Business Machines Corporation in Armonk, N.Y., running the Advanced Interactive Executive (AIX) operating system.

Further details associated with one embodiment of a client 108–112 are described with reference to FIG. 3. In one example, a client is implemented as a data processing system 300. Data processing system 300 employs, for instance, a peripheral component interconnect (PCI) local bus architecture. Although the depicted example employs a PCI bus, other bus architectures, such as Micro Channel and ISA, may be used.

In one example, data processing system 300 includes at least one processor 302 and a main memory 304 coupled to a PCI local bus 306 through a PCI bridge 308. PCI bridge 308 may include an integrated memory controller and cache memory for processor 302.

Additional connections to PCI local bus 306 may be made through direct component interconnection or through add-in boards. Typical PCI local bus implementations support three or four PCI expansion slots or add-in connectors. In the example depicted herein, a local area network (LAN) adapter 310, an SCSI host bus adapter 312, and an expansion bus interface 314 are coupled to PCI local bus 306 by direct component connection. In contrast, an audio adapter 316, a graphics adapter 318, and an audio/video adapter (A/V) 319 are coupled to PCI local bus 306 by add-in boards inserted into expansion slots. Expansion bus interface 314 provides a connection for a keyboard and mouse adapter 320, a modem 322, and additional memory 324.

Further, in the example depicted, SCSI host bus adapter 312 provides a connection for a hard disk drive 326, a tape drive 328, a CD-ROM drive 330, and a digital video disc read-only memory drive (DVD-ROM) 332.

Processor 302 includes an operating system, which is used to coordinate and provide control of various components within data processing system 300. The operating system may be a commercially available operating system, such as OS/2, offered by International Business Machines Corporation. "OS/2" is a trademark of International Business Machines Corporation, Armonk, N.Y. An object-oriented programming system, such as Java, may run in conjunction with the operating system, which provides calls to the operating system from Java programs or applications executing on data processing system 300. Instructions for the operating system, the object-oriented programming system, and applications or programs are located on a storage device, such as hard disk drive 326, and may be loaded into main memory 304 for execution by processor 302.

Figure 3:
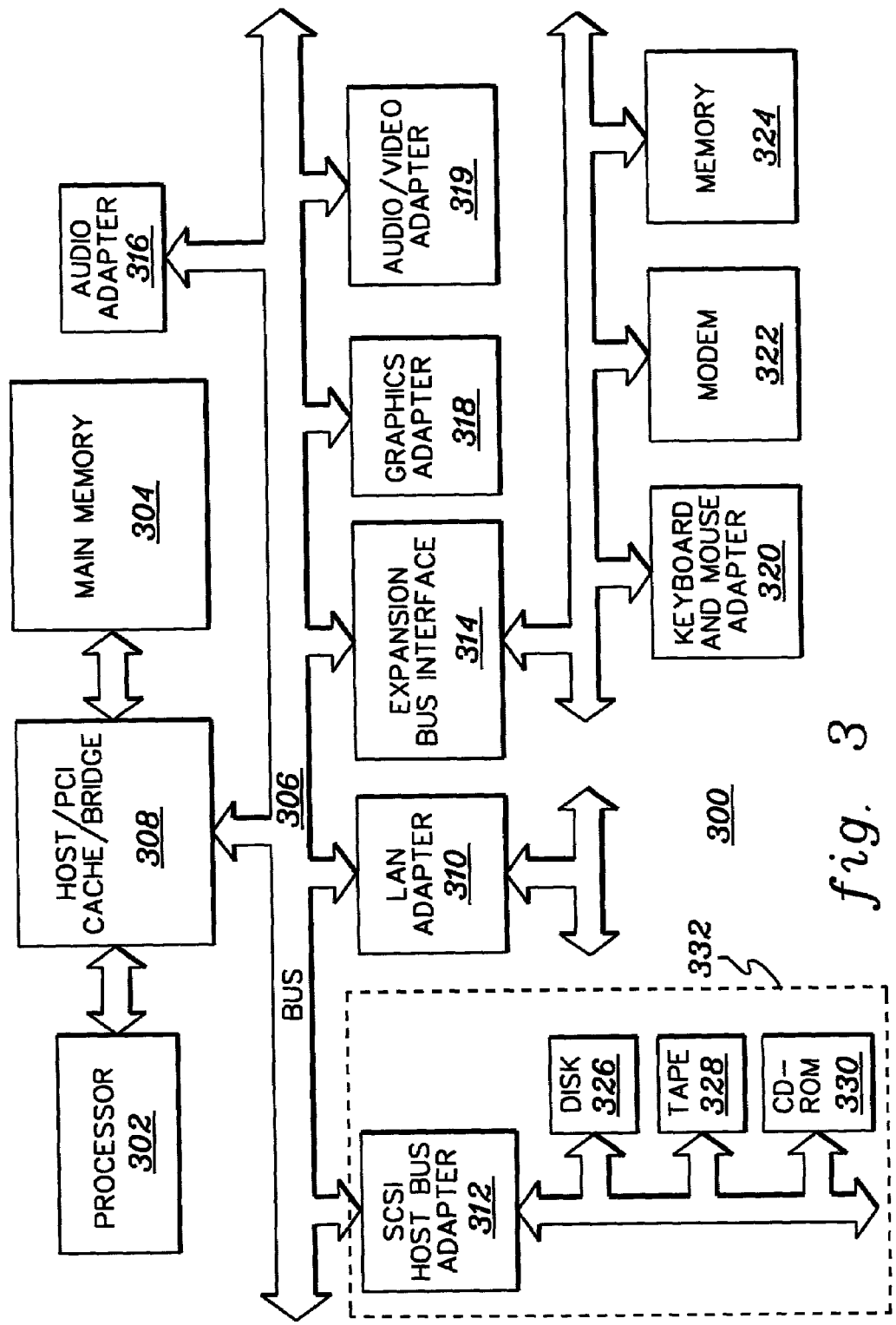
FIG. 3 depicts one embodiment of a client of FIG. 1, in accordance with an aspect of the present invention.

Those of ordinary skill in the art will appreciate that the hardware in FIG. 3 may vary depending on the implementation. For example, other peripheral devices, such as optical disk drives and the like, may be used in addition to or in place of the hardware depicted in FIG. 3. The example depicted is not meant to imply architectural limitations with respect to the present invention.

One or more aspects of the present invention may be implemented at a server, such as server 104, or at a client device, such as client 110. For purposes of the following description, it is assumed that one or more of the capabilities of the present invention are present at the server. Further-more, it is assumed that the present invention operates to generate Java source code or Java objects, although the present invention is applicable to objects in any object-oriented environment.

Often, object-oriented programs, such as those written in Java or other object-oriented languages, desire to call one or more objects, such as Common Object Model (COM) objects. In some instances, however, like with Java, the low-level interfaces of COM are much different than the interfaces of the Java program (i.e., they have different object models). Thus, a collection of methods serve as an intermediary between the Java program and the COM object. In one example, this intermediary is referred to as Bridge2Java, which is offered by International Business Machines Corporation, Armonk, N.Y.

Bridge2Java provides a technique for calling Common Object Model objects from Java. In one example, it includes a typelib processor (e.g., a process running on at least one of the processors of the communications environment) that generates Java source code from COM class typelibs. It also includes one or more runtime components, which handle the low-level calls to COM. The Bridge2Java generated Java source code is compiled by the user into classes that invoke methods in the Bridge2Java runtime components. This is further described with reference to FIG. 4.

Figure 4:
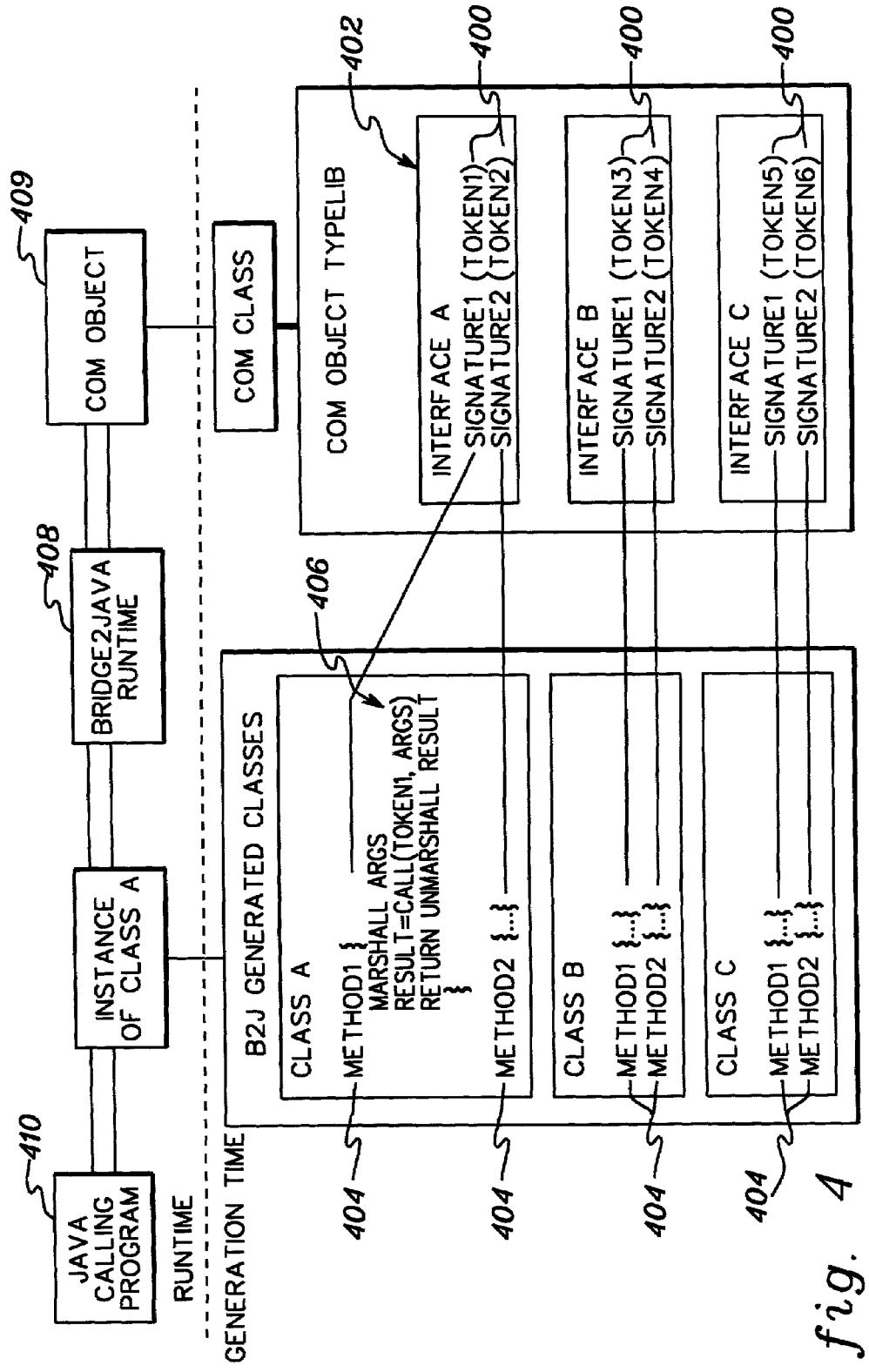
FIG. 4 depicts one embodiment of a previous technique for calling an object of one object model from an object-oriented program of another object model.

As shown in FIG. 4, each method 400 in the COM typelib 402 is processed into a corresponding Java method 404. Thus, there is a one-to-one correspondence between the COM methods and the Java methods. Each of the Java methods has a body 406, which performs a number of operations, including, for instance:

1. Marshalling, with the assistance of a Bridge2Java runtime module 408, input arguments for the calls to a COM object 409. Marshalling includes preparing a method call from one language to another language by transforming the low-level formats of the arguments of the caller to the formats used by the called method.
2. Making the COM call using the Bridge2Java runtime module and the COM dispatch id (e.g., a token identifying a method to be invoked on the object), which is compiled directly into the method; and
3. Unmarshalling (also with the assistance of the Bridge2Java runtime module) and returning the result to the Java caller. Unmarshalling includes processing return information from the called method's low-level data format to the caller's format for the corresponding data type.

In particular, at generation time (e.g., pre-compile time), the typelib processor proceeds through the list of interfaces in the COM typelib and for each method of each interface, it generates a Java method including implementation for that method. An example of such a method is as follows:

```
public void set_id(String Value)
{
    Jvariant args[ ]={new Jvariant (Value,VT_BSTR)};
    invoke_method_void(args,-2147417110,DISPATCH_
        PROPERTYPUT):
}
public String get_id()
{
    return invoke_method(null,-2147417110,DISPATCH_
        PROPERTYGET) .StringVal( );
```

This generated code is used in performing the above operations.

The generated source code of the methods can then be compiled and run. At compile time, the generated source code is type-checked, which includes verifying that each argument passed to a method is of the proper data type.

At runtime, a Java calling program 410 (e.g., an application program) calls a method in an instance of one of the generated classes. The method performs some initial marshalling to obtain a consistent set of parameters that can be used by the runtime module. It then invokes a call that proceeds to the Bridge2Java runtime module 408. The Bridge2Java runtime module takes the partially marshalled arguments and performs the rest of the marshalling of the arguments. It then transitions the marshalled arguments and the dispatch id (e.g., token) into the actual COM call. The Bridge2java runtime module makes the COM call and receives the return result from COM. It then performs the return unmarshalling. Eventually, the call returns back through the instance to the calling program.

The source code generated using the above technique enables type-checking to be performed at compile time, but tends to provide a large amount of object code. This is because COM typelibs sometimes define a large set of methods, and since each COM method is mapped to a Java method, a large amount of Java code is sometimes generated.

Thus, in accordance with an aspect of the present invention, a capability is provided in which objects of one object model, such as COM, are called from programming languages of another object model, such as Java, using a reduced amount of generated code, while preserving type-checking. In one example, these capabilities are to be included within Bridge2Java.

In accordance with an aspect of the present invention, instead of generating classes having methods with method bodies, interfaces are generated without the method bodies. Each interface includes, for instance, one or more method signatures that describe what is to be used to invoke a method. That is, each signature includes, for instance, a method name, a return value and argument types, but does not include any implementation (i.e., no method body). This is further described with reference to FIG. 5.

Figure 5:
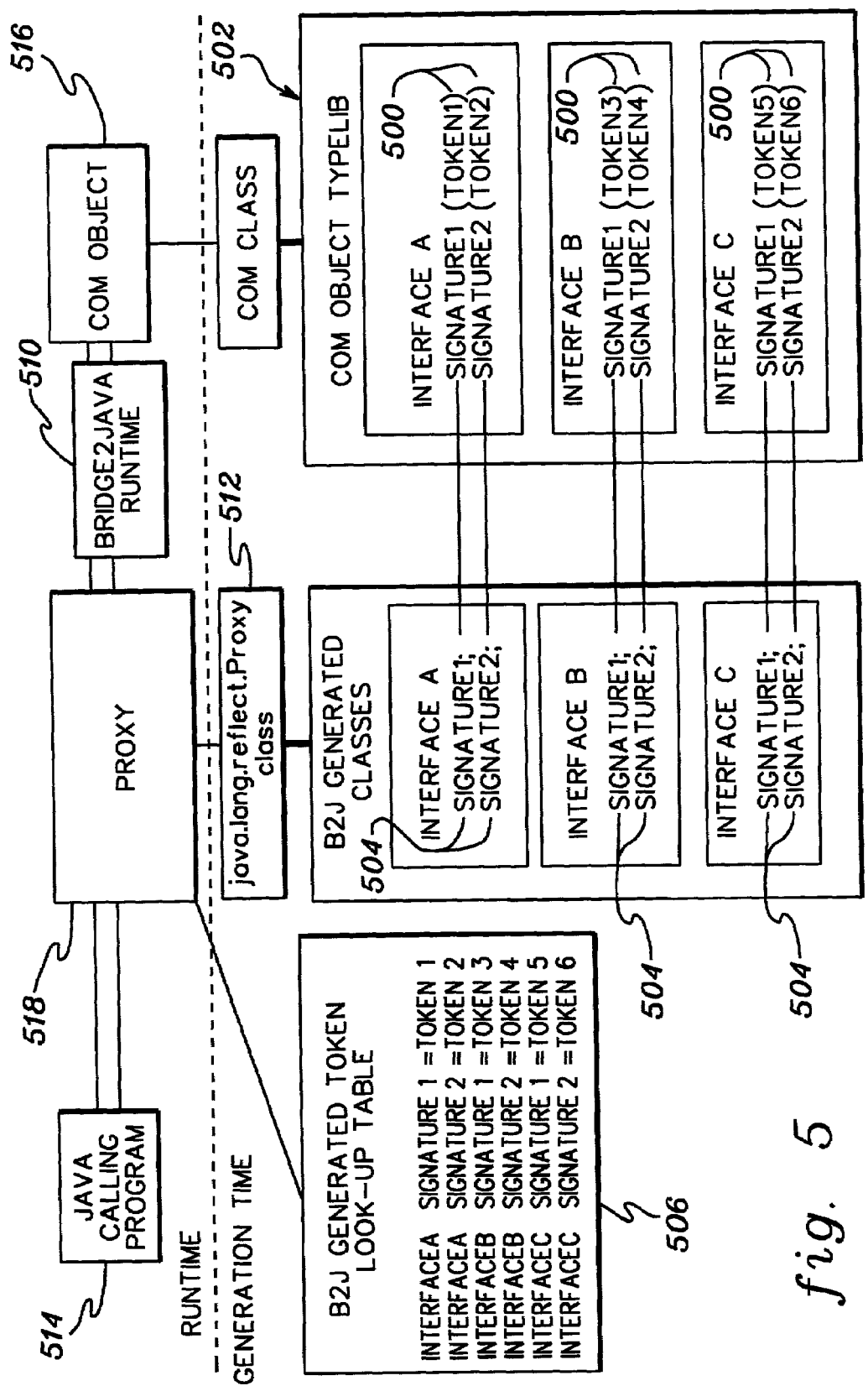
FIG. 5 depicts one embodiment of the logic associated with calling an object of one object model from an object-oriented program of another object model, in accordance with an aspect of the present invention.

As depicted in FIG. 5, for each COM method signature 500 of a COM typelib 502, there is a corresponding method signature 504 generated by the typelib processor, at generation time. The generated method signatures do not include method bodies and do not include the dispatch ids (e.g., tokens) used to call the COM objects. Instead, a look-up table 506 is used to obtain the ids, as described further below.

One embodiment of the logic associated with calling an object, such as a COM object, from an object-oriented program, such as Java, is described with reference to FIGS. 6–7. During this discussion, further reference is made to FIG. 5. For clarity, any reference numeral beginning with "5" refers to FIG. 5, any reference numeral beginning with "6" refers to FIG. 6, and any reference numeral beginning with "7" refers to FIG. 7.

Figure 6:
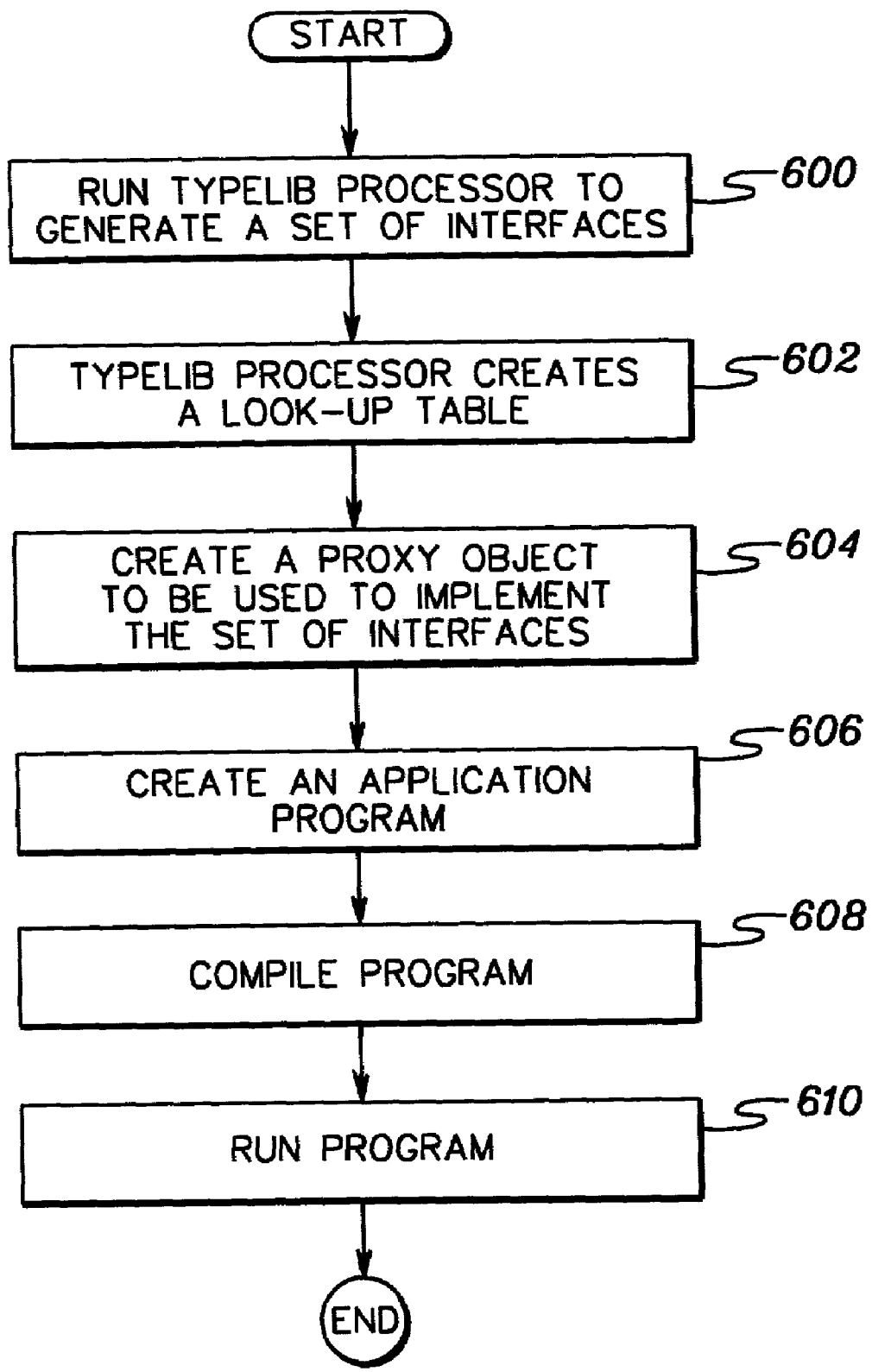
FIGS. 6–7 depict one embodiment of further details associated with calling an object of one object model from an object-oriented program of another object model, in accordance with an aspect of the present invention.

Referring to FIG. 6, initially, at generation time, the typelib processor steps through COM object typelib 502 and generates a set of Java interfaces, which corresponds to the interfaces of the typelib. That is, each interface of the typelib is represented by a Java interface. For instance, for each COM method signature of each COM interface, Java source code is generated corresponding thereto. The Java source code includes, for instance, one or more method signatures corresponding to the one or more method signatures of the typelib. (As is known, reference materials are available for assistance in generating interfaces of one type from another type.) Again, there is a one-to-one correspondence between the generated method signatures and the COM signatures. The generated signatures lack method bodies and do not include dispatch ids. However, the signatures do include arguments that can be type-checked at compile time.

In addition to generating the source code, the typelib processor also creates look-up table 506 (e.g., a hash table) that maps each generated method signature to a dispatch id (e.g., a token) used for making a COM call, STEP 602.

The generated Java interfaces are used as input to create a proxy class 512 that includes the implementations for the generated interfaces, STEP 604. For example, the proxy class contains generalized methods for marshalling/unmarshalling arguments and for looking up the appropriate interface signature in the look-up table. The creation and use of proxy objects is further described in the Java Report, "Dynamic Proxy Classes: Toward Metalevel Programming In Java", by Mathias Richter and Takashi Suezawa, Java Report, Vol. 5, No. 8, August 2000, pp. 32–34, 36, 38, 40–41, which is hereby incorporated herein by reference in its entirety.

Subsequent to generating the set of interfaces, creating the look-up table, and creating the proxy object (all of which are performed transparent to the user by a tool, such as Brige2Java), the user can reference COM objects. As one example, the user creates an application program 514, which calls one or more COM objects 516, STEP 606. When the user compiles the program, STEP 608, type-checking is performed to ensure that the arguments associated with the generated method signatures used to call the COM objects are valid. Subsequently, the program is run, STEP 610.

Figure 7:
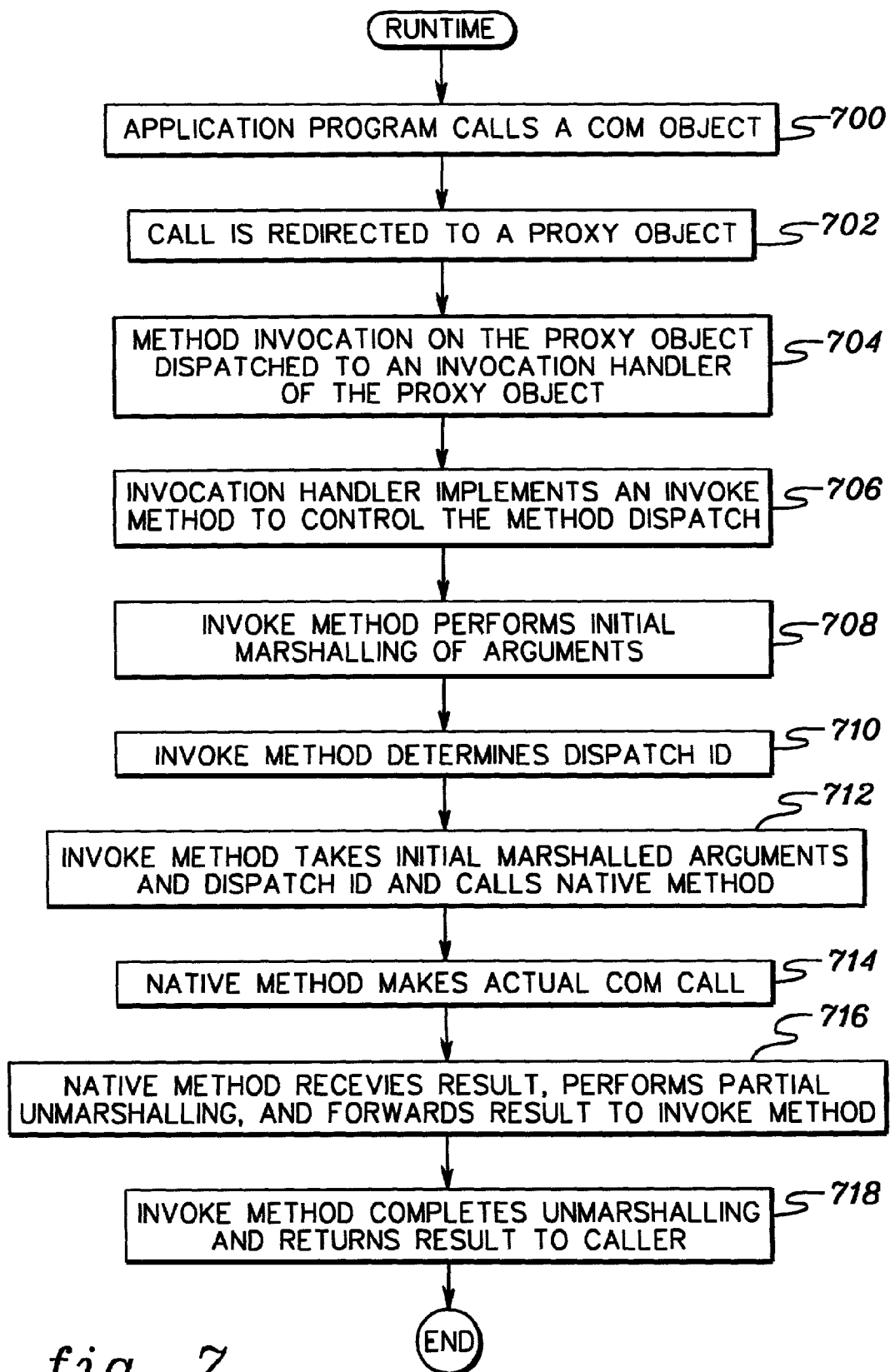

During runtime, in one example, the application makes a call to a COM object, STEP 700 (FIG. 7). In particular, the application program calls a method in an instance of the generated class. Transparent to the application program, the call is redirected to an instance 518 (i.e., an object) of the proxy class, which controls the behavior of the method invocations, STEP 702. The method invocation on the proxy object is dispatched to an invocation handler of the proxy object, STEP 704. The invocation handler implements a method called invoke, which controls the method dispatch at runtime, STEP 706. The invoke method is passed three arguments, including, for instance: the proxy object itself that identifies the method that has been invoked; the method object causing the invocation; and an object array containing the arguments for the method invocation.

The invoke method performs some of the initial marshalling of the arguments based on their types in order to provide a consistent set of parameters, STEP 708. The information used in the initial marshalling is available from the method object passed to the invoke method. The invoke method also determines the dispatch id, STEP 710. In one example, the dispatch id is determined by looking-up the number which corresponds to the invoked signature in the look-up table created by the typelib processor. The invoke method then takes the partially marshalled arguments and the dispatch id and calls the appropriate native method (e.g., of Bridge2Java runtime module 510) to handle the actual COM call, STEP 712.

The Bridge2Java runtime module then completes the marshalling and uses the marshalled arguments and the dispatch id to make the actual COM call, STEP 714. When the Bridge2Java runtime module receives the result, it performs some of the return unmarshalling and forwards the result to the invoke method, STEP 716.

The invoke method completes the unmarshalling of the result and returns the result to the Java caller, STEP 718.

Described in detail above is a capability in which objects of one object model (e.g., COM objects) are called from programs of another object model (e.g., Java programs) using a reduced set of generated code, while preserving type-checking performed during compilation of the generated code. The generated source code includes method signatures having arguments that can be type-checked during compilation time, but does not include implementations for the method signatures. Instead, the implementations are included in a proxy class. The proxies provide a convenient way to move some of the pre-compilation work performed by the typelib processor into the runtime of the proxy.

The method signatures also do not include the dispatch ids. Instead, the dispatch ids are located in a data structure (such as a table), which is accessed by the proxy class to make the appropriate call.

Advantageously, typically, the generated interfaces plus the look-up table are considerably smaller than the stub classes previously generated. Further, in accordance with an aspect of the present invention, the proxy version does not require a recompilation, if the COM dispatch numbers change.

One or more aspects of the present invention can be included and used in many types of communications environments. The communications environment described above is only one example. For example, one or more aspects of the present invention can be included and/or used in a single system environment or in a multiprocessor environment. Further, one or more of the servers and/or clients may be single systems. Additionally, although the examples are described herein with reference to Java, one or more aspects of the present invention are equally applicable to other object-oriented languages. Similarly, object models other than COM may benefit from one or more aspects of the present invention. Java and COM are just examples.

Further, although the example depicts a one-to-one correspondence between the typelib interfaces and the generated interfaces, there may be a situation in which there is no corresponding generated interface for one or more of the typelib interfaces.

The present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of processing Java format calls, said method comprising the steps of:
   at compile time, compiling a library which includes for each of a multiplicity of COM methods, a return value in a COM format for said each COM method, a name of a type of COM object to contain said each COM method and an identifier for said each COM method;
   at compile time, compiling from said library a Java interface which includes for each of said COM methods, a return value in a Java format for said each COM method and a name for said each COM method;
   at run time, in response to respective requests in Java format from an application to create respective proxy objects for corresponding COM objects, a run time program module generating said respective proxy objects, each of said proxy objects performing the following steps for the corresponding COM object:
      receiving a respective call in Java format from the application for the corresponding COM object, and in response, querying said library for the identifier for said corresponding COM method;
      transforming said respective call in Java format to a call in COM format, and invoking said corresponding COM method with said call in COM format; and
      returning to said application said return value in said Java format.

2. A method as set forth in claim 1 wherein:
   said library which is compiled at compile time also includes in COM format for each of said COM methods, types of arguments for a call to said each COM method; and
   said Java interface which is complied at compile time, also includes in Java format for each of said COM methods, types of arguments for the call to said each COM method.

3. A method as set forth in claim 2 wherein each of said calls in Java format from an application includes data defining arguments; and further comprising the step of:
   at compile time, a Java compiler using said Java interface to check validity of types of said arguments in said each of said calls in said Java format.

4. A method as set forth in claim 2 wherein said identifier for said each COM method, said return value for said each COM method, said types of arguments for a call to said each COM Method, and said COM object containing said each COM method form part of all of a signature for said each COM Method.

5. A method as set forth in claim 2 wherein:
   in response to said respective call in Java format from the application for the corresponding COM object, further comprising the step of identifying from said respective call, data defining arguments of said respective call; and
   the call transformed into the format of said corresponding COM method includes data defining arguments corresponding to the data defining arguments of said call in Java format.

6. A method as set forth in claim 1 wherein there is a one-to-one correspondence between types of said calls in Java format and corresponding COM methods.

7. A method as set forth in claim 1 wherein before the step of returning to said application said return value in said Java format, further comprising the step of transforming a format of a return value from said corresponding COM object from the format of said corresponding COM object to said Java format.

8. A method as set forth in claim 1 wherein said library which is compiled at compile time also includes a name of said each COM method.

9. A system for processing Java format calls, said system comprising a processor;
   means, at compile time, for compiling a library which includes for each of a multiplicity of COM methods, a return value in a COM format for said each COM method, a name of a type of COM object to contain said each COM method and an identifier for said each COM method;
   means, at compile time, for compiling from said library a Java interface which includes for each of said COM methods, a return value in a Java format for said each COM method and a name for said each COM method;
   means, at run time, responsive to respective requests in Java format from an application to create respective proxy objects for corresponding COM objects, for generating said respective proxy objects, each of said proxy objects including computer programming for the corresponding COM object to:
      receive a respective call in Java format from the application for the corresponding COM object, and in response, query said library for the identifier for said corresponding COM method;
      transform said respective call in Java format to a call in COM format and invoke said corresponding COM method with said call in COM format; and
      return to said application said return value in said Java format.

10. A system as set forth in claim 9 wherein:
    said library which is compiled at compile time also includes in COM format for each of said COM methods, types of arguments for a call to said each COM method; and
    said Java interface which is complied at compile time, also includes in Java format for each of said COM methods, types of arguments for the call to said each COM method.

11. A system as set forth in claim 10 wherein each of said calls in Java format from an application includes data defining arguments; and further comprising:
    a Java compiler, at compile time, which uses said Java interface to check validity of types of said arguments in said each of said calls in said Java format.

12. A system as set forth in claim 10 wherein said identifier for said each COM method, said return value for said each COM method, said types of arguments for a call to said each COM Method, and said COM object containing said each COM method form part or all of a signature for said each COM Method.

13. A system as set forth in claim 10 further comprising:
    means, responsive to said respective call in Java format from the application for the corresponding COM object, for identifying from said respective call, data defining arguments of said respective call; and wherein the call transformed into the format of said corresponding COM method includes data defining arguments corresponding to the data defining arguments of said call in Java format.

14. A system as set forth in claim 9 wherein there is a one-to-one correspondence between types of said calls in Java format and corresponding COM methods.

15. A system as set forth in claim 9 further comprising means for transforming a format of a return value from said corresponding COM object from the format of said corresponding COM object to said Java format.

16. A system as set forth in claim 9 wherein said library which is compiled at compile time also includes a name of said each COM method.

17. A computer program product for processing Java format calls, said computer program product readable by machine, tangibly embodying a program of instructions executable by the machine comprising:

a computer readable medium;

first program instructions to compile a library which includes for each of a multiplitiy of COM methods, a return value in a COM format for said each COM method, a name of a type of COM object to contain said each COM method and an identifier for said each COM method;

second program instructions to compile from said library a Java interface which includes for each of said COM methods, a return value in a Java format for said each COM method and a name for said each COM method;

third program instructions, operable at run time and responsive to respective requests in Java format from an application to create respective proxy objects for corresponding COM objects, to generate said respective proxy objects, each of said proxy objects for the corresponding COM object programmed to:

receive a respective call in Java format from the application for the corresponding COM object, and in response, query said library for the identifier for said corresponding COM method;

transform said respective call in Java format to a call in COM format and invoke said corresponding COM method with said call in COM format; and return to said application said return value in said Java format; and wherein said first, second and third program instructions are stored on said medium.

18. A computer program product as set forth in claim 17 wherein:

said library which is compiled at compile time also includes in COM format for each of said COM methods, types of arguments for a call to said each COM method; and said Java interface which is complied at compile time, also includes in Java format for each of said COM methods, types of arguments for the call to said each COM method.

19. A computer program product as set forth in claim 18 wherein each of said calls in Java format from an application includes data defining arguments; and further comprising:

fourth program instructions using said Java interface at compile time to check validity of types of said arguments in said each of said calls in said Java format; and wherein said fourth program instructions are stored on said medium.

20. A computer program product as set forth in claim 18 wherein said identifier for said each COM method, said return value for said each COM method, said types of arguments for a call to said each COM Method, and said COM object containing said each COM method form part or all of a signature for said each COM Method.

21. A computer program product as set forth in claim 18 further comprising:

fourth program instructions, responsive to said respective call in Java format from the application for the corresponding COM object, to identify from said respective call, data defining arguments of said respective call; and wherein the call transformed into the format of said corresponding COM method includes data defining arguments corresponding to the data defining arguments of said call in Java format; and wherein said fourth program instructions are stored on said medium.

22. A computer program product as set forth in claim 17 wherein there is a one-to-one correspondence between types of said calls in Java format and corresponding COM methods.

23. A computer program product as set forth in claim 17 further comprising fourth program instructions to transform a format of a return value from said corresponding COM object from the format of said corresponding COM object to said Java format; and wherein said fourth program instructions are stored on said medium.

24. A computer program product as set forth in claim 17 wherein said library which is compiled at compile time also includes a name of said each COM method.

* * * * *